United States Patent Office 3,018,820
Patented Jan. 30, 1962

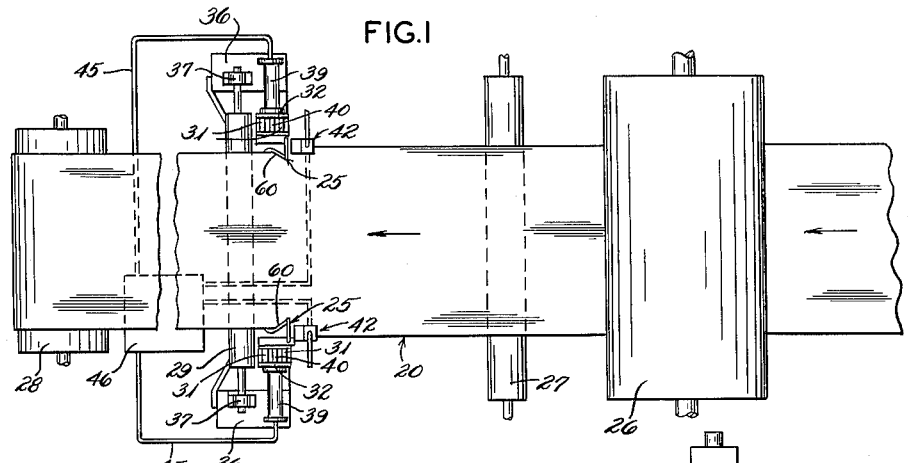
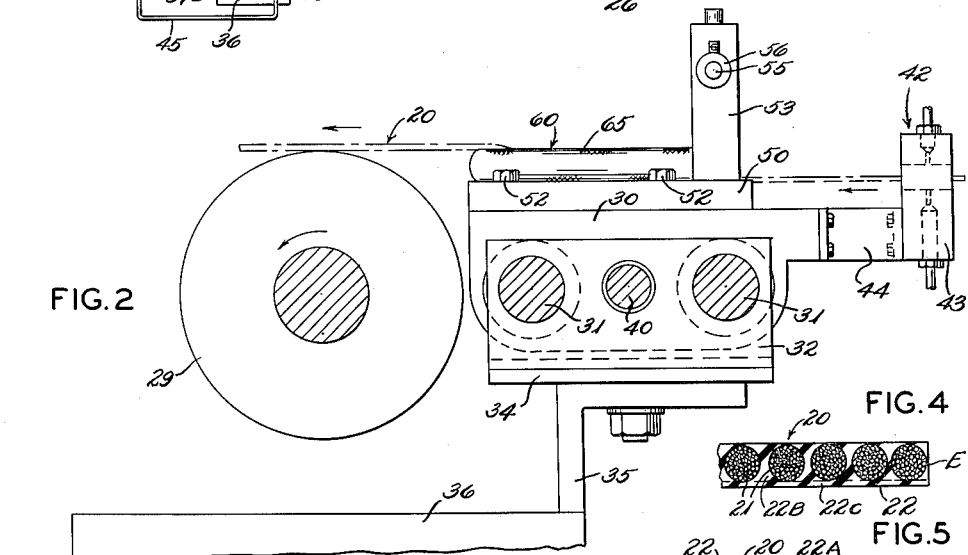
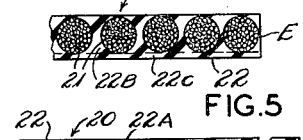
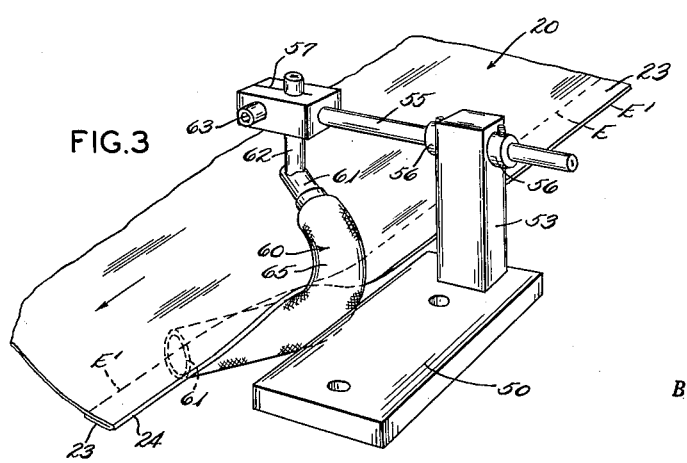
INVENTOR.
HORACE D. STEVENS

3,018,820
FABRIC EDGE TURNING DEVICE
Horace D. Stevens, Sarasota, Fla., assignor to The Firestone Tire & Rubber Company, Akron, Ohio, a corporation of Ohio
Filed Mar. 28, 1958, Ser. No. 724,571
2 Claims. (Cl. 156—465)

The present invention relates to the preparation of fabric material having a self-adhesive insulating coating and used in the manufacture of articles such as automotive tires. More particularly, the invention relates to a device for shaping the edge areas of tensioned longitudinally moving web of fabric having a self-adhesive insulating coating, the fabric having longitudinally aligned edges with a thin fin of adhesive coating extending laterally of the aligned edges.

Until recently in this art, continuous webs of bias-cut fabric material were formed by manually overlapping the ends of successive short strips and pressing the ends together. Such overlap splicing was costly and, unless performed very accurately, would also possible contribute to irregularity and imbalance of the finished tire. However, there has recently been developed apparatus which automatically performs all functions necessary to butt join or splice the trailing end of one web of bias-cut material to the leading end of a following web of material, without building up the bulk of the fabric in the area of the splice. Such apparatus requires that the end or outside cords of each fabric web be covered with a sufficient amount of rubber or other coating in a self-adhesive condition.

Therefore, it is an object of the present invention to provide improvements in equipment for the preparation and treatment of the edges of fabric material having a self-adhesive insulating coating for use in the construction of automotive tires and the like.

It is a further object to provide improved equipment for shaping the edge areas of tensioned longitudinally moving web of fabric having a self-adhesive insulating coating with longitudinally aligned edges and thin fins of adhesive coating extending laterally of the aligned edges.

These and other objects of the invention, as well as the advantages thereof, will be apparent in view of the following detailed description considered with the attached drawings.

In the drawings:

FIG. 1 is a schematic plan view of an installation of equipment according to the invention between the last roll of a calendering machine and the fabric wind-up reel;

FIG. 2 is an enlarged "left hand" view taken substantially on line 2—2 of FIG. 1;

FIG. 3 is a perspective view of a device according to the invention for contacting the "left hand" edge of a moving web of fabric;

FIG. 4 is a sectional view of the fabric edge while on a calendering unit and prior to the application of an upper insulating skim coat or layer of rubber;

FIG. 5 is a sectional view of the fabric edge after application and preparation of an upper layer of coating to form a laterally extending fin;

FIG. 6 is a sectional view of the fabric edge after contact and shaping by the device shown in FIG. 3; and FIG. 7 is a sectional view of an improved butt joint or splice made possible by the present invention.

In the preparation of fabric material for use as tire plies, the cords of rayon, nylon, cotton or similar materials are dipped in specially formulated liquid rubber compounds and tension dried. Rubberizing of the fabric then follows and is done on a rubber calender or calenders by applying individual strips (or skim coats) of rubber on each side of the fabric and squeezing the rubber and fabric between the calender rolls sufficiently to cause the rubber to flow between and about each cord, thereby affording uninterrupted rubber insulation of the cords, as will be understood by those familiar with rubberizing by calendering cord tire fabric.

Referring to FIGS. 4 and 5, the rubberized fabric material is indicated generally by the numeral 20 and includes the individual cords 21 and the insulating coating 22. In the finished form of the material 20, the separately applied layers of the coating 22 become bonded homogeneously around and between the cords due to the pressure of the calender rolls. However, for purposes of understanding the present invention, the coating 22 is best described as having an upper layer 22A, a medial layer 22B and a lower layer 22C.

Referring specifically to FIG. 4, the layers 22B and 22C are first applied. The outer edge E is then trued and squared by a suitable means such as a hot knife (not shown) on the calender unit so that the outer edges of layers 22B and 22C are coextensive and longitudinally aligned. Referring specifically to FIG. 5, the upper layer 22A is then applied. The outer edge E' of layer 22A, which is then preferably trued and squared, forms a fin 23. The fin 23 has a thickness which is preferably one-tenth to one-quarter the thickness of the composite material 20. The width of the fin, that is the distance between E and E', is preferably five to ten times the composite thickness of the material 20. In any event, the upper insulating layer 22A is applied so as to form a fin 23 of substantial width in relation to thickness.

In the form of the invention shown the fin 23 is wrapped around or turned progressively under and bonded to the medial and lower layers 22B and 22C so that the outer edge 24 of the material 20 is shaped in the manner shown in FIG. 6.

FIG. 7 is intended to show a typical improved quality butt joint or splice made possible by the specially prepared edge 24 of the material 20. The substantial thickness of adhesive coating provided by wrapping and turning the fin 23 ensures adhesion between the abutting edges of two strips of bias-cut material.

Referring to FIG. 1, it is preferred that both edges of a web of fabric material 20 be prepared simultaneously. Each fin 23 of the upper insulating layer is shaped and bonded to the medial and lower layers 22B and 22C by an individual edge treating device, indicated generally by the numeral 25. The devices 25 for either side of the web 20 are identical except for being opposite hand.

After passage through the calender unit, the last roll of which is indicated at 26, the web 20 is drawn over a first idler support roll 27 by a wind-up reel 28. A second idler support roll 29 is located behind the first to provide a tensioned span of the fabric material to which each edge treating device 25 is applied.

Referring to FIG. 2, each edge treating device 25 is carried by a guide or mounting block 30. Each block 30 is movably mounted on and stabilized by a pair of parallel slide rods 31. Each pair of slide rods 31 are mounted between a pair of end plates 32, mounted one on either end of a transverse base plate 34 carried on a flange 35. The flange 35 extends upwardly from a support stand 36.

Referring to FIG. 1, the second idler support roll 29 may be journaled in bearing blocks 37 carried on the support stand 36. Each edge treating device 25 is moved transversely or laterally of the web of fabric material 20 by a conventional fluid-actuated cylinder 39 mounted on an end plate 32 and having an extensible shaft 40 connected to a slidable block 30.

The lateral movement of each edge treating device 25, in response to extension or retraction of each cylinder shaft 40, may be controlled by any suitable web edge position detector means located adjacent and one on either side of the tensioned span of fabric between the rolls 27 and 29 and indicated generally by the numeral 42. In one form of installation in which the device 25 may be employed, the edge detector means 42 is as shown in U.S. Patent No. 2,794,444, issued June 4, 1957, to Frank J. Markey and assigned to Askania Regulator Company, Chicago, Illinois. However, other suitable detecting means, including photo-electric cells and receivers, could also be used.

The purpose of each edge detector means 42 is to position the device 25 in relation to the fin 23 and the edge E' of the web 20, as described in detal below. The detector head 43 is mounted on a bracket 44 extending to one side of a slidable block 30. Suitable piping 45 connects each detector head 43 with a common power source 46 (see FIG. 1) to supply actuating fluid to the cylinders 39.

Each edge treating device 25 includes a preferably rectangular plate 50 attached to the mounting block 30 as by bolts 52 (see FIG. 2). Extending upwardly from the plate 50 is a block 53 supporting a rod or shaft 55. The rod 55 is adjustable transversely of the support block 53 so as to extend over a fabric web 20, as by set screw collars 56. The end of rod 55 adapted to be extended over the fabric web terminates in a slotted stud 57, which may be rectangular as shown or any other convenient shape.

The stud 57 carries a hook or sickle-shaped member 60 which contacts the edge of a moving fabric web 20 and continuously wraps or turns the fin 23 to a position of parallelism with the lower web layer 22C so that the outer edge 24 of the web is shaped in the manner shown in FIG. 6. The member 60 includes a curved core element 61 having a stem 62 extending upwardly through the stud 57. The height of the hook member 60 in relation to the web 20 is determined by adjustment of the stem 62 and the clamp screw 63. The core element 61, which is preferably round, is covered with a sleeve 65 which provides a working surface for contacting the fabric web 20 which is curved or generally cylindrical in cross-section.

The sleeve may be a woven or knitted fabric of natural or synthetic fibre having a low coefficient of friction in relation to the moving web 20. However, other materials such as a plastic tubing which would not affect the chemical composition of the web coating and which had a low friction surface, could also be used. The use of a fabric sleeve 65 is preferable because a woven or knitted material can be fitted on the core element 61 smoothly and without wrinkling. It has also been found that a fabric sleeve can readily be lubricated by a solvent which will not affect the properties of the fabric web and thus the coefficient of friction can be held to a suitable value.

The hook or sickle-shaped member 60 is positioned, by adjustment of the rod 55 and stem 62, so that the edge of the fabric web 20 will pass under one end and over the other end. As shown in FIG. 3, the fabric web 20 is moving from right to left in the direction of the arrow. The extended fin 23 begins to turn under about the E as the web passes under the leading end of the hook 60. At the point where the web begins to pass over the hook 60, the turning action is complete and the fin 23 is parallel to and in flattened contact with the lower layer 22C of the web. As the web passes over the trailing end of the hook 60, the fin 23 is pressed into a condition of adherence with the edge E and the lower layer 22C.

What is claimed is:

1. A device for shaping the edge area of a longitudinally moving web having a self-adhesive insulating coating, said coating having a longitudinally aligned lower edge and an overlying thin fin extending laterally of said edge, comprising, a sickle-shaped core element adjustably supported so that one end is above and the other end is below said web inwardly of said edge and a smooth fitting lubricant adsorbing sleeve on said element, said core element and sleeve between said ends providing a curved working surface for turning said fin around said edge to a condition of adherence with said edge and web.

2. A device for shaping the edge area of a longitudinally moving web having a self-adhesive insulating coating, said coating having a longitudinally aligned lower edge and an overlying thin fin extending laterally of said edge, comprising a sickle-shaped core element adjustably supported so that one end is above and the other end is below said web inwardly of said edge and a woven fabric sleeve fitted over said element, said core element and sleeve providing a curved working surface for turning said fin around said edge to a condition of adherence with said edge and web.

References Cited in the file of this patent
UNITED STATES PATENTS

| | | |
|---|---|---|
| 1,464,632 | Wayne | Aug. 14, 1923 |
| 2,001,575 | James | May 14, 1935 |
| 2,195,959 | Maguire | Apr. 2, 1940 |
| 2,311,085 | Rudolph | Feb. 16, 1943 |
| 2,499,908 | Figge | Mar. 7, 1950 |
| 2,709,268 | Kamborian | May 31, 1955 |
| 2,874,752 | Brey | Feb. 24, 1959 |